United States Patent
Alowersson et al.

(10) Patent No.: US 6,625,151 B1
(45) Date of Patent: Sep. 23, 2003

(54) MULTICASTING METHOD AND ARRANGEMENT

(75) Inventors: Jonas Alowersson, Malmö (SE); Per Andersson, Lund (SE); Patrik Sundström, Osby (SE)

(73) Assignee: SwitchCore AB (SE)

( * ) Notice: Subject to any disclaimer, the term of this patent is extended or adjusted under 35 U.S.C. 154(b) by 0 days.

(21) Appl. No.: 09/420,909

(22) Filed: Oct. 20, 1999

(30) Foreign Application Priority Data

Oct. 21, 1998 (SE) .............................................. 9803583

(51) Int. Cl.⁷ .............................................. H04L 12/28
(52) U.S. Cl. ...................................... 370/390; 370/392
(58) Field of Search ................................. 370/389, 390, 370/392, 395.1, 397, 414, 419, 432, 412, 418, 905

(56) References Cited

U.S. PATENT DOCUMENTS

| | | | |
|---|---|---|---|
| 5,229,991 A | * 7/1993 | Turner | 370/389 |
| 5,287,530 A | * 2/1994 | Davis et al. | 370/390 |
| 5,463,624 A | 10/1995 | Hogg et al. | |
| 5,724,349 A | 3/1998 | Cloonan et al. | |
| 5,724,358 A | * 3/1998 | Headrick et al. | 370/418 |
| 5,898,687 A | * 4/1999 | Harriman et al. | 370/390 |
| 6,067,298 A | * 5/2000 | Shinohara | 370/395.71 |
| 6,128,292 A | * 10/2000 | Kim et al. | 370/356 |

* cited by examiner

Primary Examiner—Chau Nguyen
Assistant Examiner—Nittaya Juntima
(74) Attorney, Agent, or Firm—Coudert Brothers LLP

(57) ABSTRACT

The invention relates to a method and an arrangement for multicasting, i.e. point to multipoint transmission of a data packet. A packet is copied and transmitted to multiple addresses. In the multicasting arrangement, switch core and input and output port are connected to input and output links, respectively, for transmitting data packets. According to the invention, the input port is adapted to detect a multicasting packet received on an input link or from an output port and send the multicasting packet to an output port. The output port is adapted to detect the multicasting packet, copy the data packet, modify an address portion of the multicasting packet, send one packet on the output link and return one packet with the modified address portion to an input port. Preferably, the input port and the output port are integrated in a link interface having a direct channel for returning the data packet. The present invention improves the efficiency of multicasting by distributing copying of the data packets on several output ports of the switch core (e.g. an ATM switch).

14 Claims, 2 Drawing Sheets

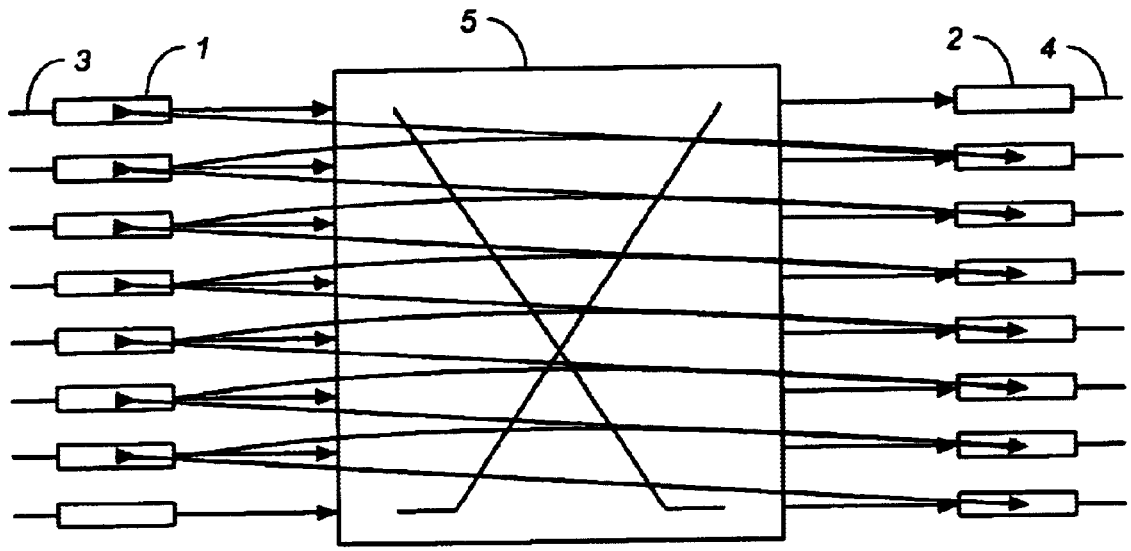
FIG._1
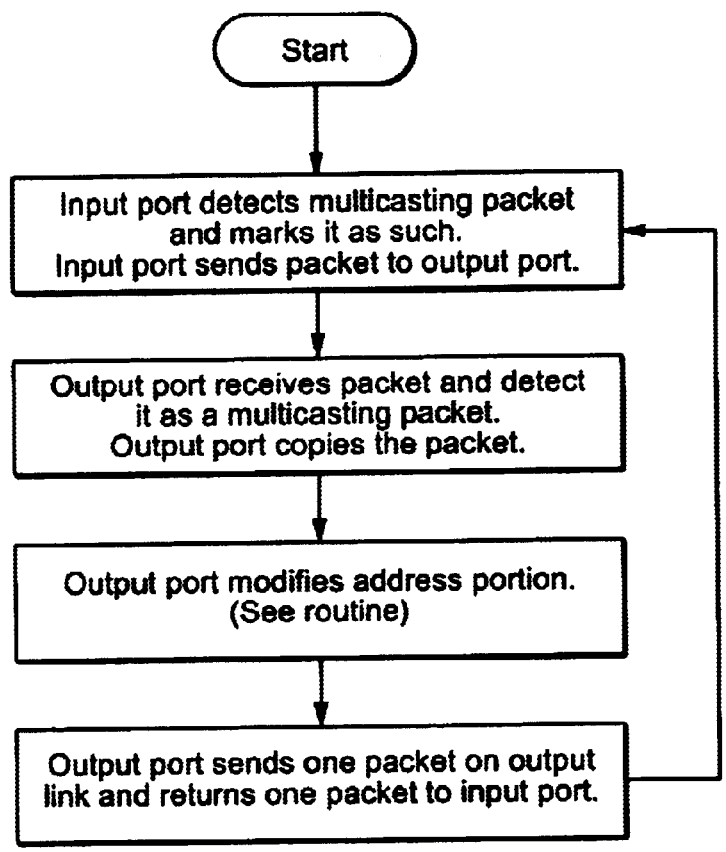
FIG._2

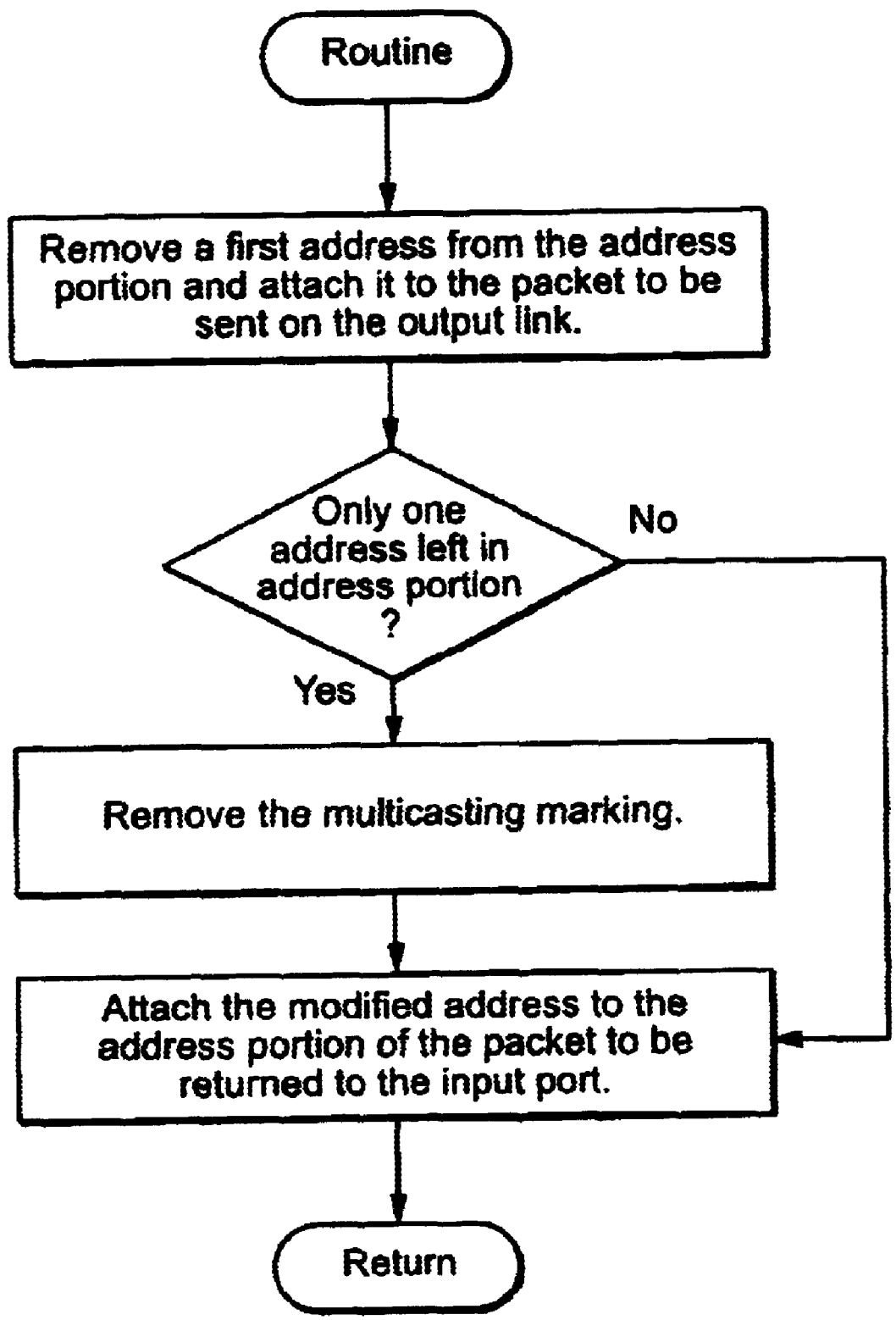
FIG._3

MULTICASTING METHOD AND ARRANGEMENT

FIELD OF THE INVENTION

The present invention relates to a method and an arrangement for multi-casting, i.e. point to multipoint transmission of a data packet. A packet is copied and transmitted to multiple addresses. The present invention improves the efficiency of multicasting by distributing copying of the data packets on several output ports of a switch core (e.g. an ATM switch).

STATE OF THE ART

Various arrangements for achieving multicasting are known in the prior art. Generally, a multicasting packet is received by an input port of a packet switch. In a first solution, the input port is required to copy a data packet such that a copy may be sent on a number of output links to each address of an address portion. A problem with this technology is that the input port is monopolised by the multicasting packet so that the input port is blocked during the copying. Thus, undesired delays are created making this solution unsuitable for fast streaming of multicast data.

Another alternative is to let the replication be performed by buffering the message in the switch core, and let the output port read it once for each intended receiver. This requires decision making in the switch core logic, which is the most time critical part of the switch, and in high speed systems it is favourable to keep this as simple as possible.

The present invention solves this problem by transferring the copying function from the input port to the output port of the packet switch. The output port copies the data packet and sends one packet on its output link while one copy is returned with a modified address to an input port. This input port handles this copy as a new multicasting packet and sends it on to an output port which again performs the copying function. This process is iterated until the last address of the original multicasting packet is reached and the last copy is transmitted.

SUMMARY OF THE INVENTION

Thus, the present invention provides a multicasting arrangement comprising a switch core and input and output ports connected to input and output links, respectively, for transmitting data packets.

According to the invention, the input port is adapted to detect a multicasting packet received on an input link or from an output port and to send the multicasting packet to an output port. The output port is adapted to detect the multicasting packet, copy the data packet, modify an address portion of the multicasting packet, send one packet on the output link and return one packet with the modified address portion to an input port.

Preferably, the input port and the output port are integrated in a link interface having a direct channel for returning the data packet.

The present invention also provides a multicasting method. The arrangement and method according to the invention are set forth in claims 1 and 8, respectively, while preferred embodiments are defined in the dependent claims.

BRIEF DESCRIPTION OF THE DRAWINGS

The invention will be described below with reference to the acompanying drawings, in which:

FIG. 1 is a block diagram of an embodiment of the present invention,

FIG. 2 is a flow chart of the method according to the invention,

FIG. 3 is a flow chart of a subroutine of the flow chart in FIG. 2.

DETAILED DESCRIPTION OF PREFERRED EMBODIMENTS

In FIG. 1, the multicasting arrangement according to the present invention is shown in schematic form. The general structure does not differ from an ordinary ATM (Asynchronous Transfer Mode) switch. However, the functions of the various components-have been modified to achieve the new functionality of the present invention. As will be appreciated by a person skilled in the art, the various components may be integrated in the same physical unit but they are shown here as logically separated.

Data packets are received on input links 3 of input ports 1. Output ports 2 handle and transmit packets on their output links 4. The input ports 1 and output ports 2 are generally integrated in a single unit, a so called link interface. There is a direct transmission channel between the output port and the input port in each link interface. A switch core 5 interconnects one input port 1 with any of the output ports 2. The general function of the switch is to forward data packets from the input links to the output links.

In the case of multicasting packets, identical data packets are to be transmitted from one input link to several addresses contained in an address portion, such as an information header or the like. As is mentioned above, the prior art ATM switches employ an input port to copy the data packet to the number of addresses required. This will mean that the input port is busy for a while and causing a delay in the switch. Alternatively, there is a buffer in the switch core from which the output ports read the message repeatedly.

The arrangement according to the present invention employs a different methodology. The method is illustrated in flow chart format in FIGS. 2 and 3.

First, the input port 1 receives a packet on its input link 3, as in the prior art, or from its output port 2 via the direct channel which is possible in the present arrangement. The input port 1 detects if the packet received is a multicasting packet. If this is the case, the input port 1 marks the packet as a multicasting packet, e.g. by tagging the message with a multicast bit. It is possible that the multicasting packet already contains a special multicasting marking. Thereafter, the input port 1 sends the packet to an output port 2.

The output port 2 receives the packet and detects if it is a multicasting packet. If it is not a multicasting packet, it is sent on directly on the output link 4 and the process according to the invention is not entered. Assuming it is a multicasting packet, the output port copies the packet into two copies.

The address modification routine is set forth in FIG. 3. The output port reads the address portion of the multicasting packet and extracts a first address to which a first copy of the data packet is to be sent. This address is removed from the address portion and attached to a packet to be sent directly on the output link 4. The remainder of the address portion, that is less one address, is attached to the other copy which is sent back to its input port 1 through the direct channel. The input port treats the packet as a new multicasting packet in the same manner as described above, i.e. the multicasting packet with the modified address is forwarded to an output port through the switch core.

The address routine is of course dependent of the protocol used. Also, in a pure ATM case, the addressing is simplified in that only an address table has to be changed.

After the output port has modified the address portion., when the multicasting packet has looped a number of times, there will eventually the only one address left. In this case the output port removes the multicasting marking, since the packet now only contains one address and is in fact no longer a multicasting packet. Thus, when this packet has been returned to an input port, and sent back to an output port it will be forwarded on an output link 4 directly without any copying being required.

In a first embodiment of the invention, the input port 1 sends the multicast packet through the switch core 5 to the next output port 2 in series. Thus, all the output ports 2 are employed in a predetermined order. In an alternative embodiment, the switch core 5 may select an output port 2 at random, in order to achieve a more distributed data flow.

In order to achieve multicast streaming with full bandwidth, the bandwidth between the input port and the output port, that is within the switch core, must be as high as that of the input and output links.

Thus, the present invention has several advantages over the prior art ATM switch. The input ports are not monopolised but a constant load on the input ports is achieved. The input ports may handle simultaneous data streams since multicasting and point to point data packets contend on an equal basis. This enables a continuous data flow.

A person skilled in the art will appreciate that the invention may be implemented in a number of alternative ways using various combinations of hardware and software. All such combinations are intended to fall within the scope of the invention which is only limited by the claims below.

What is claimed is:

1. A multicasting arrangement, comprising:
   a switch core; input ports; and output ports, said input and output ports connected to respective input links and output links for transmitting data packets, wherein each said input port detects a multicasting data packet received on an associated input link or from output port, and sends the multicasting data packet through the switch score to an output port, and wherein each said output port detects the multicasting data packet, copies the data portion of the multicasting data packet such that two new data packets are created, modifies an address portion of the multicasting data packet, sends one of said new data packets on a corresponding one of said output links, and returns another of said new data packets with the modified address portion to an input ports.

2. A multicasting arrangement according to claim 1, further including a plurality of direct transmission channels, wherein each of said channels is coupled between one of said output ports and one of said input ports, said channels being integrated together in a link interface.

3. A multicasting arrangement according to claims 1 or 2, wherein each said input port marks said multicasting data packet when said multicasting data packet is received on an input link and each said output port detects the mark.

4. A multicasting arrangement according to claim 1, wherein each said output port
   modifies the address portion of said multicasting data packet by removing one address and attaches said one address to the packet to be sent on the corresponding one of the output links, and
   attaches the modified address portion to said another of said new data packets to be returned to an input port.

5. A multicasting arrangement according to claim 1, wherein the input port sends the multicasting data packet through the switch core to a selected one of said output ports in a predetermined order.

6. A multicasting arrangement according to claim 1, wherein the input port sends the multicasting data packet through the switch core to a selected one of said output ports in a random order.

7. A multicasting arrangement according to claim 1, wherein the input ports are capable of handling point to point data packets and multicasting data packets on an equal contention basis.

8. A multicasting method for transmitting data packets by means of a switch core and input ports and output ports connected to input links and output links, respectively, comprising the steps of:
   detecting at an input port a multicasting packet received on an associated input link or from an output port;
   sending the multicasting packet through said switch core to a selected output port;
   detecting the multicasting packet in said selected output port;
   copying the data portion of the multicasting packet in said selected output port such that two new data packets are created;
   modifying an address portion of the multicasting packet in said selected output port;
   sending one of said new data packets on a corresponding one of said output links; and
   returning another of said new data packets with the modified address portion to an input port.

9. A multicasting method according to claim 8, wherein the step of returning another of said new data packets includes a direct transmission on a channel between one of the selected output ports and one of the input ports in a link interface.

10. A multicasting method according to claims 8 or 9, further comprising the steps of each input port the multicasting packet when said packet is received on an input link and each output port the mark.

11. A multicasting method according to claim 8, further comprising the steps of:
    modifying the address portion of said multicasting packet in said selected output port to remove one address;
    attaching said one address to said one of said new packets to be sent on the corresponding one of the output links; and
    attaching the modified address portion to said another of said new data packets to be returned to an input port.

12. A multicasting method according to claim 8, further comprising the step of sending the multicasting packet from one of said input ports through the switch core to a selected one of said output ports in a predetermined order.

13. A multicasting method according to claim 8, further comprising the step of sending the multicasting packet from one of said input ports through the switch core to a selected one of said output ports in a random order.

14. A multicasting method according to claim 8, wherein the input ports handle point to point data packets and multicasting packets on an equal contention basis.

* * * * *